US011891702B2

(12) United States Patent
Molz et al.

(10) Patent No.: US 11,891,702 B2
(45) Date of Patent: Feb. 6, 2024

(54) LONG-LIFE NOZZLE FOR A THERMAL SPRAY GUN AND METHOD MAKING AND USING THE SAME

(71) Applicant: OERLIKON METCO (US) INC., Westbury, NY (US)

(72) Inventors: Ronald J. Molz, Ossining, NY (US); Dave Hawley, Westbury, NY (US)

(73) Assignee: OERLIKON METCO (US) INC., Westbury, NY (US)

( * ) Notice: Subject to any disclaimer, the term of this patent is extended or adjusted under 35 U.S.C. 154(b) by 709 days.

(21) Appl. No.: 14/650,383

(22) PCT Filed: Dec. 19, 2013

(86) PCT No.: PCT/US2013/076610
§ 371 (c)(1),
(2) Date: Jun. 8, 2015

(87) PCT Pub. No.: WO2014/120358
PCT Pub. Date: Aug. 7, 2014

(65) Prior Publication Data
US 2015/0329953 A1 Nov. 19, 2015

Related U.S. Application Data

(60) Provisional application No. 61/759,086, filed on Jan. 31, 2013.

(51) Int. Cl.
*C23C 4/134* (2016.01)
*H05H 1/34* (2006.01)

(52) U.S. Cl.
CPC ........... *C23C 4/134* (2016.01); *H05H 1/3457* (2021.05); *H05H 1/3478* (2021.05); *Y10T 29/49433* (2015.01)

(58) Field of Classification Search
CPC ............. H05H 1/34; H05H 2001/3457; H05H 2001/3478; C23C 4/134; C23C 4/137
See application file for complete search history.

(56) References Cited

U.S. PATENT DOCUMENTS 4,140,892 A 2/1979 Muller
5,004,888 A * 4/1991 Wolf ........................ H05H 1/34 219/119

(Continued)

FOREIGN PATENT DOCUMENTS

CN 101167412 4/2008
CN 101878677 11/2010

(Continued)

OTHER PUBLICATIONS

Chinese Office Action dated Dec. 9, 2016 issued in CN 201380072067.

(Continued)

*Primary Examiner* — Dah-Wei D. Yuan
*Assistant Examiner* — Stephen A Kitt
(74) *Attorney, Agent, or Firm* — GREENBLUM & BERNSTEIN, P.L.C.

(57) ABSTRACT

Thermal spray gun (1) and/or nozzle (120) includes a nozzle body and a liner material (123) arranged within the nozzle body. A material of the nozzle body has a lower melting temperature than that of the liner material (123). A wall thickness (C) of the liner material (123) has a value determined in relation to or that corresponds to a wall thickness (D) of the nozzle body. Alternatively or additionally, a ratio of a total wall thickness of a portion of a nozzle (120) to that of a wall thickness (C) of the liner material (123) has a value determined in relation to or that corresponds to the wall thickness (C) of liner material (123).

12 Claims, 10 Drawing Sheets

(56) References Cited

U.S. PATENT DOCUMENTS

| | | | | |
|---|---|---|---|---|
| 5,770,273 | A | 6/1998 | Offer | |
| 5,897,059 | A | 8/1999 | Muller | |
| 6,042,019 | A | 3/2000 | Rusch | |
| 6,963,045 | B2 * | 11/2005 | Zapletal | H05H 1/34 219/121.48 |
| 8,253,058 | B2 | 8/2012 | Zehav | |
| 2006/0289396 | A1 | 12/2006 | Duan | |
| 2006/0289404 | A1 | 12/2006 | Hawley | |
| 2010/0078408 | A1 | 4/2010 | Leibold | |
| 2010/0237050 | A1 * | 9/2010 | Zehavi | H05H 1/42 219/121.47 |

FOREIGN PATENT DOCUMENTS

| | | |
|---|---|---|
| JP | 62-87268 | 4/1987 |
| JP | 8-319553 | 12/1996 |
| JP | 10-52660 | 2/1998 |

OTHER PUBLICATIONS

PCT IPRP dated Aug. 13, 2015 and issued in International Application No. PCT/US2013/076610 (6 pages).

PCT Search Report and Written Opinion issued in International Application No. PCT/US13/76610.

Japanese Office Action dated Dec. 20, 2017 issued in JP 2015-556009.

* cited by examiner

Fig. 2
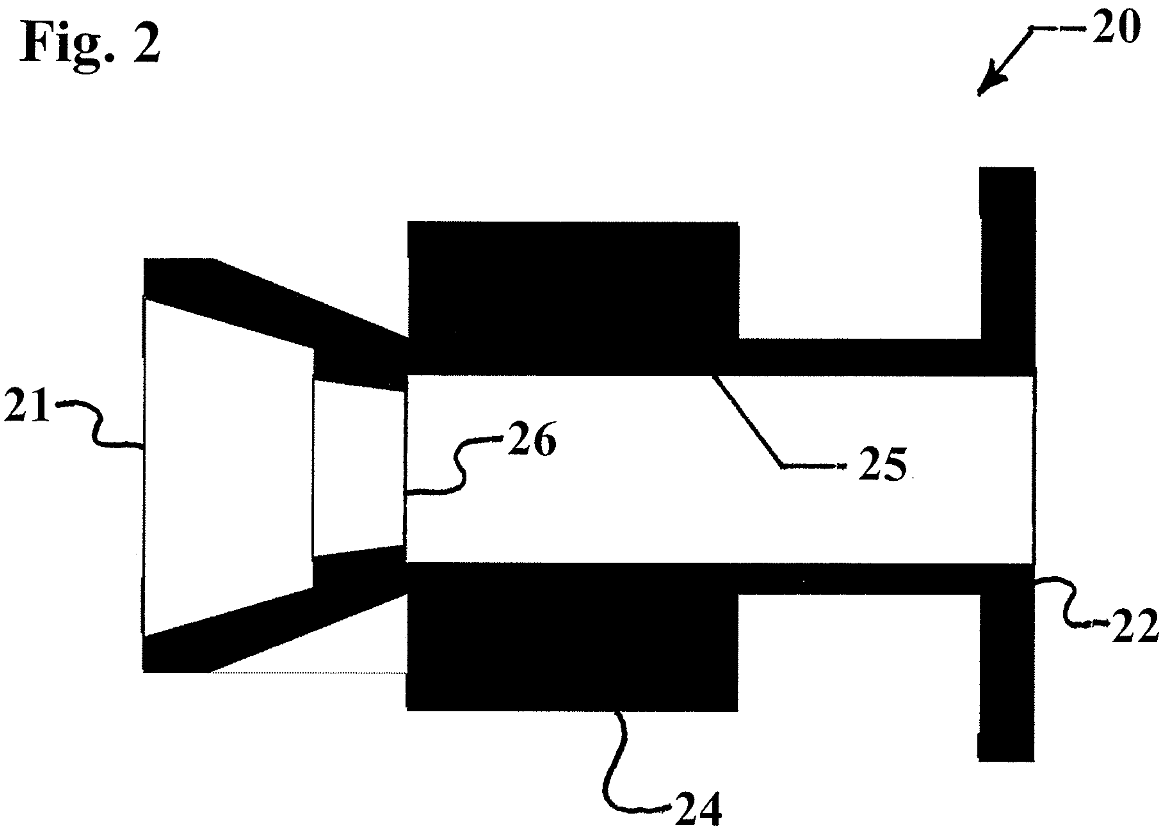
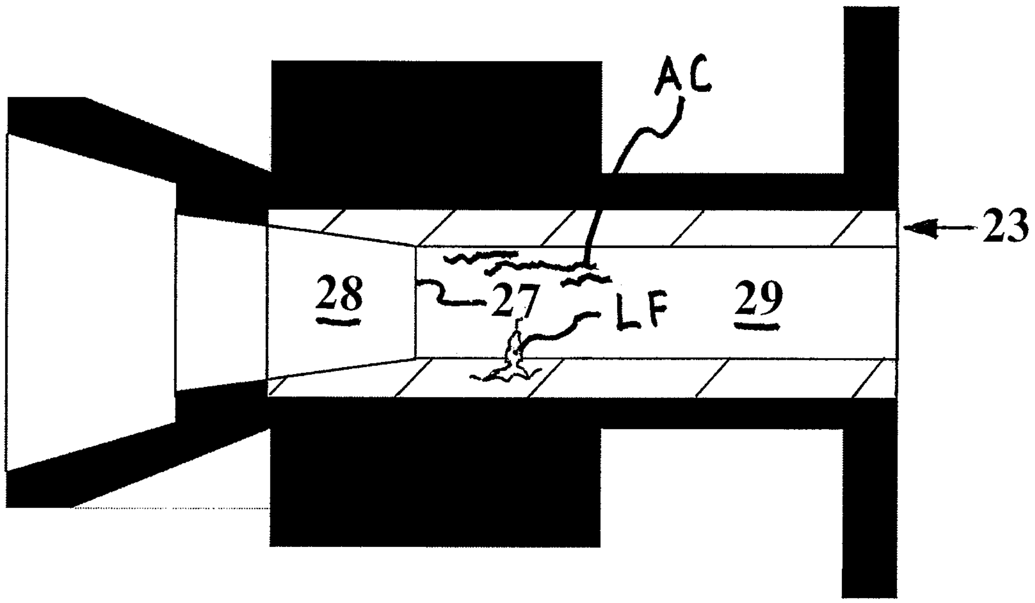
Fig. 3

B - B

LONG-LIFE NOZZLE FOR A THERMAL SPRAY GUN AND METHOD MAKING AND USING THE SAME

CROSS-REFERENCE TO RELATED APPLICATIONS

The instant application is a US National Stage Application of International PCT Application No. PCT/US2013/076610 filed on Dec. 19, 2013, which published as WO 2014/120358 on Aug. 7, 2014, and is based on and claims the benefit of U.S. provisional application No. 61/759,086 filed on Jan. 31, 2013, the disclosure of each of which is hereby expressly incorporated by reference thereto in its entirety.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

Nozzles used in thermal spray guns are typically lined with a liner material or sleeve in order to promote longer hardware life. A common liner material is Tungsten (W). Historically, a wall thickness of the Tungsten liner was set arbitrarily, i.e., based upon considerations such as using a common or standard diameter Tungsten blank for a complete family of nozzle bore diameters, with the main concern being ease of manufacture. Thus, there was no attempt to study or optimize characteristics of the lining material such as lining wall thickness. The typical Tungsten material used for the lining material was often chosen to be the same as that used for the plasma gun cathode (i.e., the cathode electrode). This choice was also made for reasons of ease of manufacture since it only requires the sourcing of a single material.

Although Tungsten lined plasma gun nozzles have increased life, when compared to nozzles without such lining materials, they are nevertheless subject to cracking and even failure. The cracking is believed to result from high thermal localized stresses occurring within the Tungsten and worsens over time as the plasma gun is operated. The cracking typically occurs in an area or zone known as the arc attaching zone, as will be described below with reference to FIG. 3. This is a zone where a plasma arc makes electrical contact with an inside surface of the lining material after being discharged from a tip area of the cathode. It is this zone of the Tungsten lining that is believed to experience the most thermal stress.

In most cases the cracks align axially with the gun (or Tungsten lining) bore. These axial cracks (see ref. AC in FIG. 3) can have an effect on the overall hardware life as well as on the arc behavior. In some cases, however, cracks can form that are instead oriented circumferentially within the plasma nozzle bore (see ref. LF in FIG. 3). These cracks are more problematic than the axial cracks, and have been associated with the catastrophic failure of the Tungsten lining; in which portions of the lining actually separate from the lining material, enter the plasma stream and can even be introduced into (or contaminate) the coating of the substrate being coated by the plasma spray gun. At the very least, the presence of these circumferential cracks have a large adverse effect on plasma arc stability—resulting in an even greater effect than that produced by the axial cracks. To prevent this, nozzles are typically replaced on a regular basis; which adds to manufacturing costs of the coating.

Since there is no way to predict the potential for the more problematic circumferential cracks and the eventual catastrophic failure of the lining material, personnel operating plasma guns equipped with such nozzles must be extra diligent in checking for signs of potential cracking—which can sometimes be detected by monitoring plasma gun voltage behavior. Based on such signs, the operator will typically stop the coating process and replace the nozzle with a new nozzle. This unpredictability has, at the very least, the effect of reducing the operating lifetime advantage of Tungsten lined nozzles.

Thus, there remains a need to improve the consistency, predictability and operating life of plasma gun hardware as well as the overall gun performance. One way to do this is to reduce the potential for cracking within the nozzle lining or nozzle bore.

SUMMARY OF THE INVENTION

In accordance with one non-limiting embodiment, there is provided a thermo or thermal spray gun or system which overcomes one or more of the disadvantages of conventional or existing systems and/or reduces the potential for cracking or crack formation within the nozzle bore, and especially within the lining material lining the nozzle bore.

In accordance with one non-limiting embodiment, there is provided a thermo spray gun comprising an improved lining material having a significantly longer operating life and/or a reduced potential for crack formation.

In accordance with one non-limiting embodiment, there is provided a nozzle for a thermo spray gun comprising a lining material wall thickness (at least along a predetermined axial length of the bore) that has been tailored to the nozzle body so that significant thermal stresses are not created in an area of the arc attachment zone.

In accordance with one non-limiting embodiment, there is provided a nozzle for a thermo spray gun comprising a lining material having at least one mechanical characteristic that is tailored or customized to one or more other portions of the plasma gun or nozzle such that significant thermal stresses are not created (or whose potential is significantly reduced) in the lining material, and especially an area of the bore known as the arc attachment zone.

In accordance with another non-limiting embodiment, there is provided a thermal spray gun comprising a nozzle body and a liner material arranged within the nozzle body. A material of the nozzle body has a lower melting temperature than that of the liner material. A ratio of a total wall thickness of a portion of a nozzle to that of a wall thickness of the liner material has a value determined in relation to or that corresponds to the wall thickness of liner material. The liner material comprises one of a material other than Lanthanated Tungsten and a Lanthanated Tungsten and the ratio being between about 4.75:1 and about 5.75:1.

In embodiments, the ratio is equal to or greater than about 3.5:1.

In embodiments, the ratio is at least one of: between about 3.5:1 and about 7:1; between about 4:1 and about 6:1; around about 5:1. Other exemplary ratios can include; equal to or greater than about 3:1; equal to or greater than about 4:1; equal to or greater than about 5:1; equal to or greater than about 6:1; and equal to or greater than about 7:1.

In embodiments, the liner material is Tungsten.

In embodiments, the nozzle body is made of a copper material.

In embodiments, the wall thickness of the nozzle body and the liner material are each measured in an axial area of an arc attachment zone.

In embodiments, in normal operation, while the liner material experiences more thermal stress in an area of an arc attachment zone than in an area downstream of the arc attachment zone, such stresses are reduced significantly compared to conventional nozzle arrangements so that the area of the arc attachment zone experiences stresses below a level that would cause stress failure, thereby significantly improving the working life of the liner material and nozzle.

In embodiments, the wall thickness of the liner material is at least one of: between about 0.25 mm and about 1.25 mm; between about 0.50 mm and about 1.0 mm; and most preferably between about 0.75 mm and about 1.0 mm.

In embodiments, thermo spray gun further comprises a cathode and an anode body through which cooling fluid circulates.

In accordance with another non-limiting embodiment, there is provided a nozzle for a thermo spray gun comprising a nozzle body and a liner material arranged within the nozzle body. A material of the nozzle body has a lower melting temperature than that of the liner material. A wall thickness of the liner material has a value determined in relation to or that corresponds to a wall thickness of the nozzle body. Alternatively or additionally, a ratio of a total wall thickness of a portion of a nozzle to that of a wall thickness of the liner material has a value determined in relation to or that corresponds to the wall thickness of liner material.

In embodiments, the nozzle is a replaceable nozzle.

In embodiments, a first portion of the liner material has an internal tapered section and a main portion of the liner material is generally cylindrical.

In accordance with another non-limiting embodiment, there is provided a method of making a nozzle of any of the types described above, wherein the method comprises forming the liner material with a wall thickness whose value takes into account at least one of a wall thickness of a portion of the nozzle body and a ratio of a total wall thickness of a portion of the nozzle to that of a wall thickness of a portion of the liner material.

In accordance with another non-limiting embodiment, there is provided a method coating a substrate using a thermo spray gun, comprising installing the nozzle of any of the types described above on the thermo spray gun and spraying a coating material onto a substrate.

In accordance with advantageous aspects of the invention, there is also provided a method making a nozzle that performs optimally with a least amount of thermal stress, whose materials experiences lower operating temperatures, and which reduces the potential to minimize boiling of the cooling fluid.

In accordance with other advantageous aspects of the invention, there is also provided a method making a nozzle which shows no signs of circumferential cracking after prolonged operation, and thus does not experience, among other things, catastrophic failure of the Tungsten lining, melting of the Tungsten lining, and internal melting of the copper nozzle body.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted drawings by way of a non-limiting example embodiment of the present invention, and wherein:

FIG. 2 shows a schematic nozzle used in the plasma gun of FIG. 1 and with the lining material removed for purposes of illustration;

FIG. 3 shows the nozzle of FIG. 2 with a Tungsten lining material disposed therein. Also shown are examples of both axial cracks and a circumferential lining failure crack formed in the lining as can occur after a significant amount of use in a plasma gun;

In FIG. 11*a*, the cracking shown occurs in the typical location and depth as the cracks observed in actual nozzles;

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
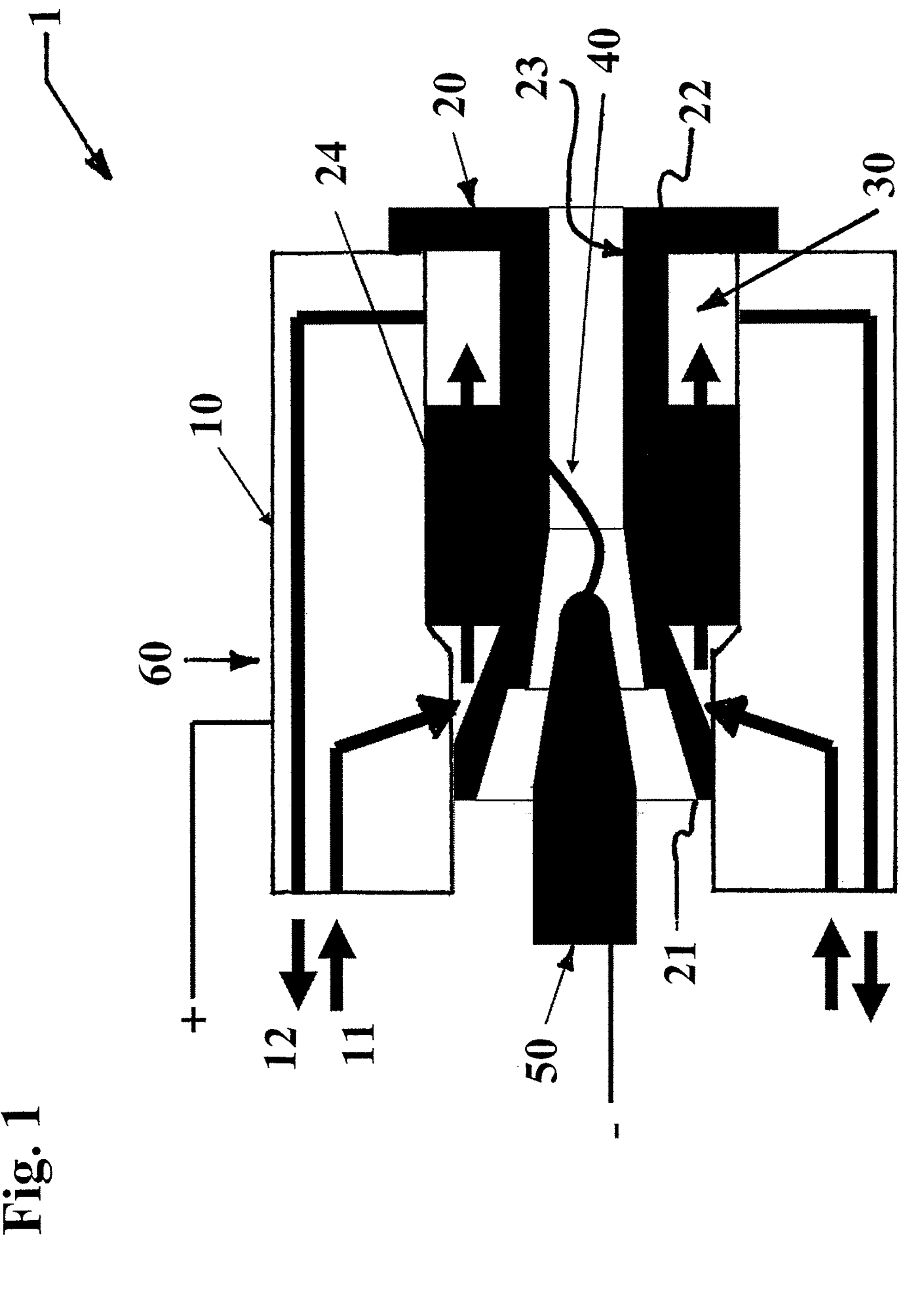
FIG. 1 shows a side cross-section schematic view of a thermo spray gun having a nozzle with a Tungsten lining material.
Figure 5:
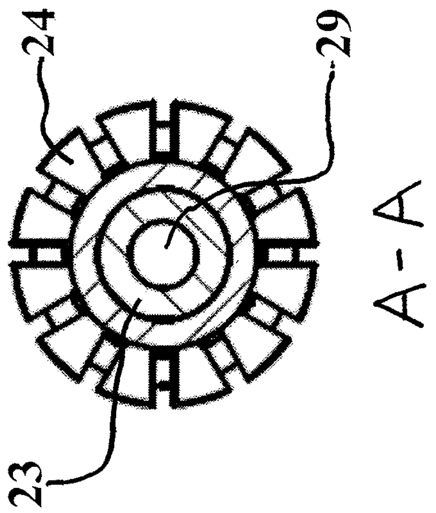
FIG. 5 shows a cross-section view of Section A-A in FIG. 4.

Plasma guns used to spray coatings, like the one encompassed by the invention, have a cathode and an anode. The anode can also be referred to as a nozzle in these plasma guns as it also serves a fluid dynamic function in addition to functioning as the positive side of the electrical circuit forming the plasma arc. The nozzle is fluid cooled, i.e., with water, to prevent melting and is typically constructed of a copper material as it possesses a high thermal conductivity. Nozzles having a lining of Tungsten located in an area of the inside bore facing the plasma arc are produced to provide improved/longer hardware life over those just made of copper. Tungsten possess a relatively high thermal conductivity as well as a very high melting temperature. FIG. 1 schematically shows a cross section of a plasma gun having a water-cooled nozzle which can be used in accordance with the invention.

Tungsten lined plasma nozzles use Tungsten linings that are typically 1 or more mm in thickness. In some cases the Tungsten may be over 3 mm in thickness. The lining material sleeve is often made of Thoriated Tungsten, which is the same composition used in plasma gun cathodes or electrodes. Both the composition and overall diameter of the Tungsten used to fabricate the nozzle, however, is typically chosen as a matter of convenience. In many cases, the outside diameter of the Tungsten liner used is held constant while its bore diameter varies according to a particular application of gun type. No consideration in the design or configuration of these plasma gun nozzles is given to selecting an optimal wall thickness for the Tungsten lining.

In addition to the thickness of the Tungsten lining, the ratio of the wall thickness of the lining to the overall wall thickness of the nozzle body from the closest distance to the cooling water channel is typically around 1:2. This means the wall thickness of the Tungsten liner is about as thick as the wall thickness of the copper body.

As will be shown below with reference to FIG. 6, it has been discovered that having a relatively thick (wall thickness) Tungsten lining and a relatively high Tungsten to copper thickness ratio can result in high concentrations of internal stress being formed in the Tungsten lining during operation. This can result in the eventual failure of the Tungsten liner as mentioned above. The invention, which will be described with reference to FIGS. 1-5 and 7-10, takes into account these considerations.

FIG. 1 schematically shows a plasma spray gun that can be used to practice the invention. The plasma gun 1, like a conventional plasma gun, includes a gun body 10 that can accommodate a nozzle 20 and which includes, among other things, cooling passages which circulate cooling fluid entering via an inlet 11 and exiting via an outlet 12. The cooling passages are such that cooling fluid enters spaces 30 surrounding the nozzle 20 and passes (see direction of arrows) from a first annular space arranged on one side of nozzle cooling fins 24 to a second annular space arranged on an opposite side of the cooling fins 24. The cooling fluid is heated by the cooling fins 24 and functions to transfer heat away from the nozzle 20 out through the outlet 12.

The nozzle 20 has a first or cathode receiving end 21 and a second or plasma discharging end 22 having a flange. The cooling fins 24 surround an intermediate portion of the nozzle 20 and function to conduct heat away from an area of the nozzle bore which experiences heating generated by electric arc 40. The arc 40 results when a voltage potential is created between a cathode 50 and an anode 60 whose function is performed by the body 10. The arc 40 can form anywhere in the bore an area referred to as an arc attachment zone 70 (see FIG. 4). Because this zone experiences very significant heating due to the arc 40, the cooling fins 24 are arranged in an area of the nozzle body surrounding this zone. As explained above, the nozzle 20 also can include a lining material 23. which can withstand higher temperatures than the material making up the main portion or body of the nozzle 20. In the example shown in FIG. 1, the material making up the main portion or body of the nozzle 20 is a copper material while the liner or lining material 23 is a Tungsten material.

Figure 4:
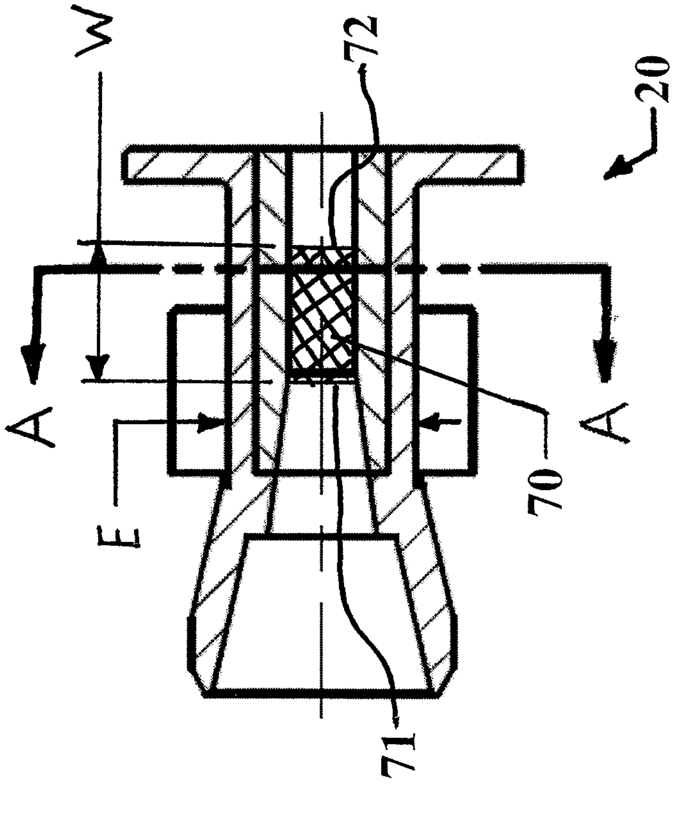
FIG. 4 shows a commercially usable nozzle similar to that of FIG. 3 and illustrating an arc attachment zone which is shown in crisscross sectioning.

With reference to FIGS. 2-4, it can be seen that the nozzle 20 (with the liner removed) defines a lining receiving opening 25 (see FIG. 2) which is generally cylindrical and extends between the discharging end 22 and an annular shoulder 26. The liner 23 typically has an outer cylindrical diameter slightly larger than the opening 25 so that there is an interference fit there-between all the way up to the point where it contacts the annular shoulder 26 (see FIG. 3). During manufacture of the nozzle 20, the main bore 29 and tapered inlet section 28 are machined to the desired specification sizes. As explained above, when the nozzle 20 is used for a significant amount of time during plasma spraying, axial cracks AC and even circumferential cracks leading to lining failure LF can result. These are shown in FIG. 3 for purposes of illustration, and typically occur in the arc attachment zone 70 schematically illustrated in FIG. 4. The zone 70 typically extends from a position 71 located slightly upstream of a diameter transition point 27 (see FIG. 3) to a position 72 located downstream of the point 27. The width of the zone 70 can be defined by the value "W". Although this zone 70 can vary in axial length, and the arc 40 does not contact or move around to every part of the inner surface in the zone 70 equally, it generally has a maximum axial width defined by the positions 71 and 72.

Figure 6:
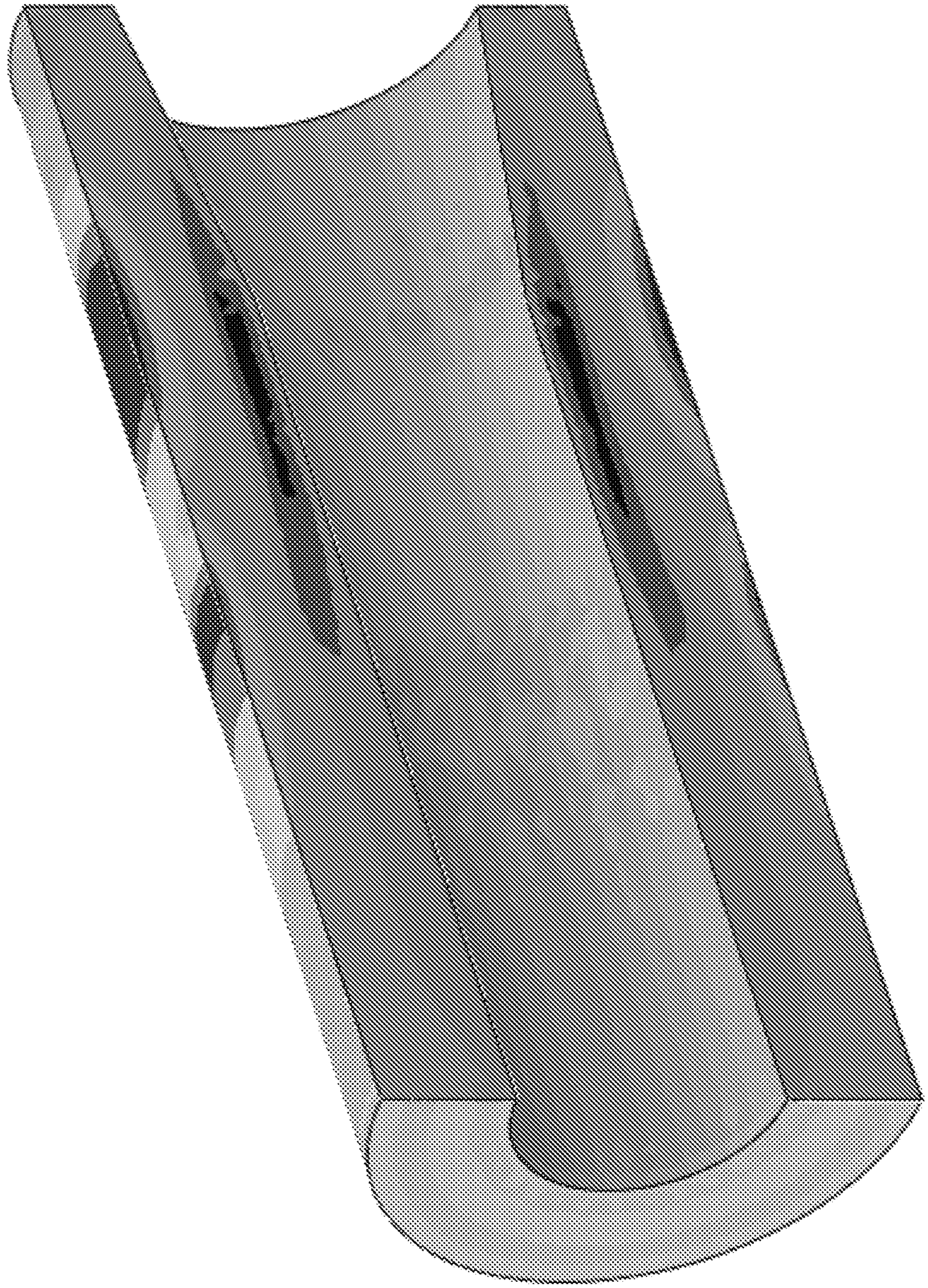
FIG. 6 shows a computer model cross-section of a bore portion of a conventional nozzle lining and illustrates the localized thermal stresses (shown as darker regions) which occur in an area of the arc attachment zone.

With reference to FIG. 6, it can be seen that if the liner 23 is not properly sized to the nozzle 20 (as is the case conventionally), the result is that very significant localized thermal stresses can be created in the liner material, and are especially located in the arc attachment zone. This is evident in the computer model shown in FIG. 6 which shows the areas of highest thermal stresses in dark shading being located in the arc attachment zone portion of the liner material. The invention aims to avoid the kind of stresses evident in FIG. 6, but takes into consideration the information provided therein. Moreover, when one compares the example of FIG. 6 with that of FIG. 3, one can appreciate that the stress concentrations that occur within an incorrectly designed Tungsten lined plasma nozzle, can lead to internal cracking as observed in FIG. 3. As is apparent, the cracking shown in FIG. 3 occurs in the very area of FIG. 6 which shows the highest stress, i.e., within the area known as the arc attachment zone 70.

Figure 7:
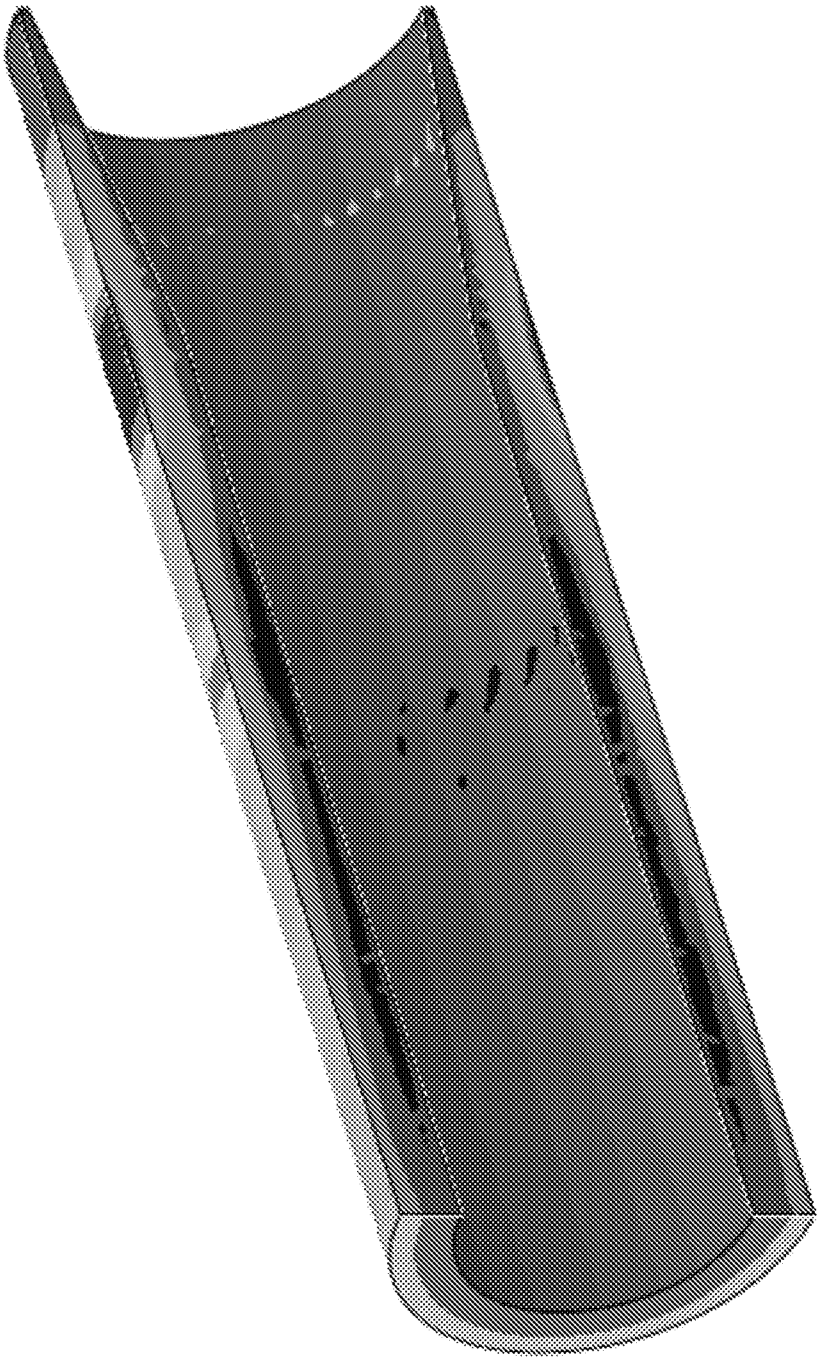
FIG. 7 shows a computer model cross-section of a bore portion of a nozzle lining in accordance with an embodiment of the invention and shows an absence of localized thermal stresses in an area of the arc attachment zone in contrast to FIG. 6.

With reference to FIG. 7, it can be seen that if the liner 23 is properly sized to the characteristics of the nozzle 20 (as is the aim of the invention), the result is that very significant localized thermal stresses are no longer created in the liner material, and especially are not concentrated in the arc attachment zone 70. This is evident in the computer model shown in FIG. 7 which (in contrast to FIG. 6) no longer shows areas of highest thermal stresses being located in the arc attachment zone of the liner material. Instead, the computer model shows an absence of localized thermal stresses in an area of the arc attachment zone. In particular, unlike FIG. 6, the thermal stresses resulting from the invention are less localized, are more attenuated, do not occur to greater extent in the arc attaching zone, are very significantly reduced in the arc attachment zone, and are more even distributed throughout the downstream length of the nozzle bore.

Figure 11A:
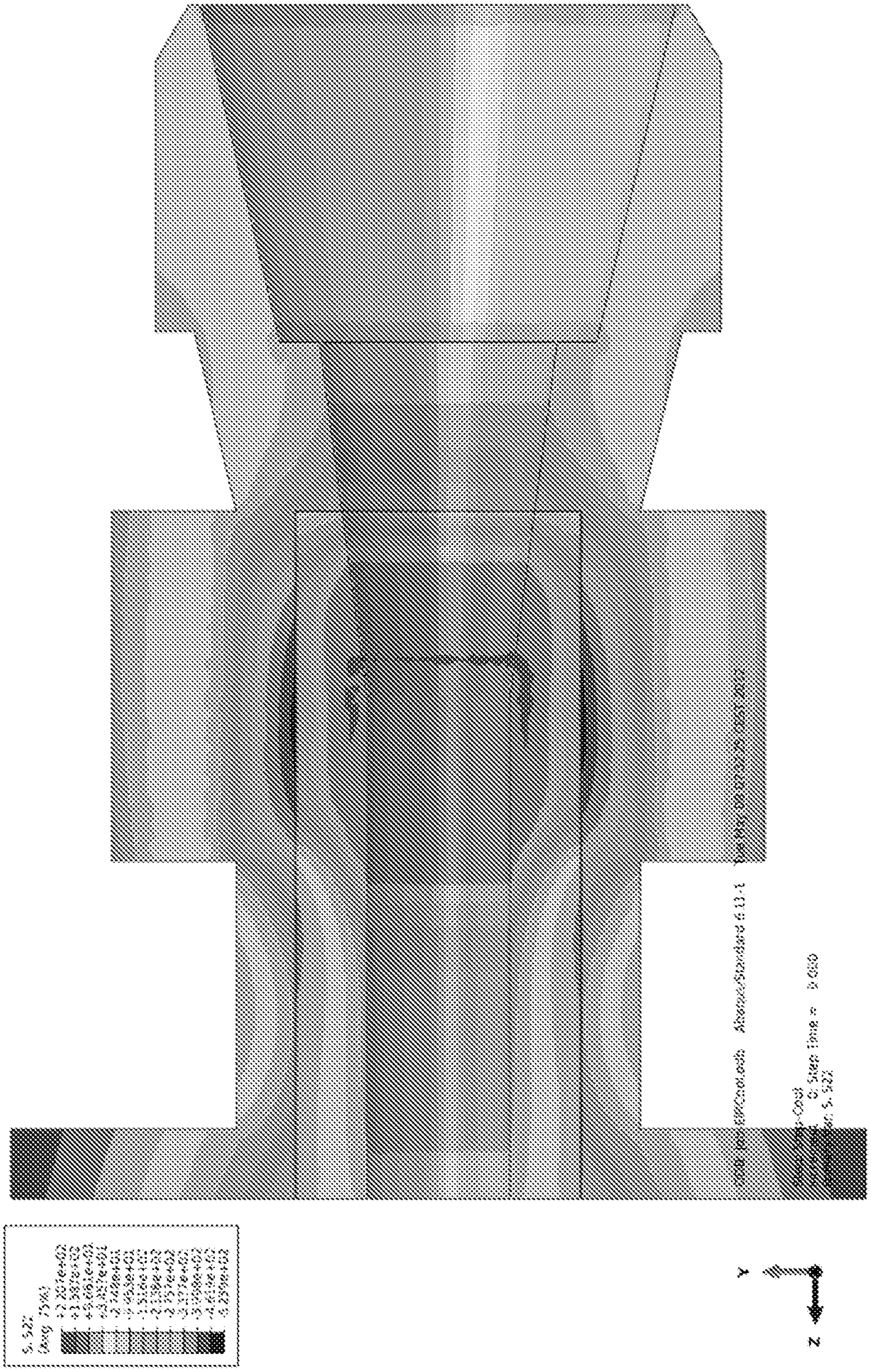
FIG. 11*a* shows a computer model cross-section view of a conventional nozzle and illustrates localized thermal stresses (temperature induced tensile stresses shown in darker regions) which occur in the nozzle when operated at a given test parameter.
Figure 11B:
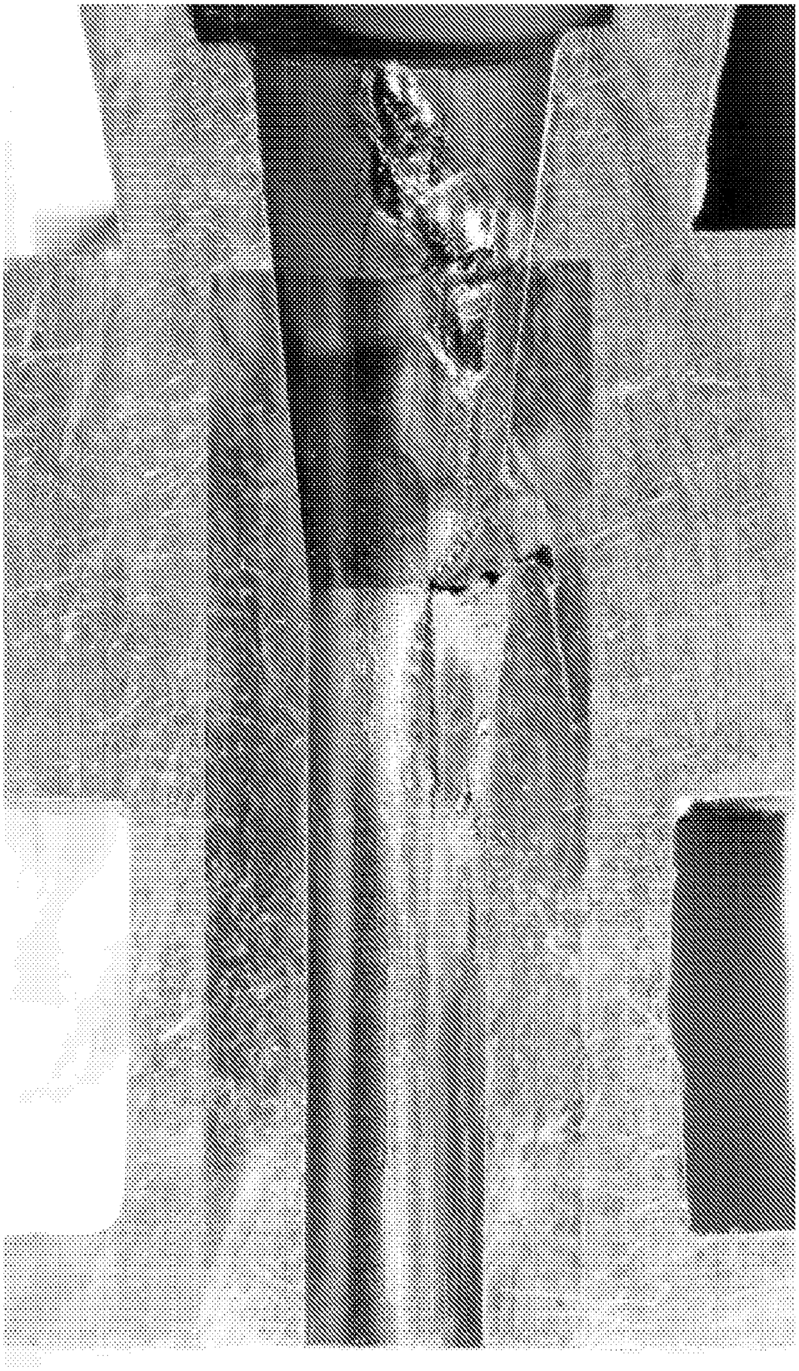
FIG. 11*b* shows a cross-section view of an actual conventional nozzle operated at the same test parameter as that modeled in FIG. 11*a*, and thus exhibits a catastrophic stress failure comparable that predicted in the model.
Figure 11C:
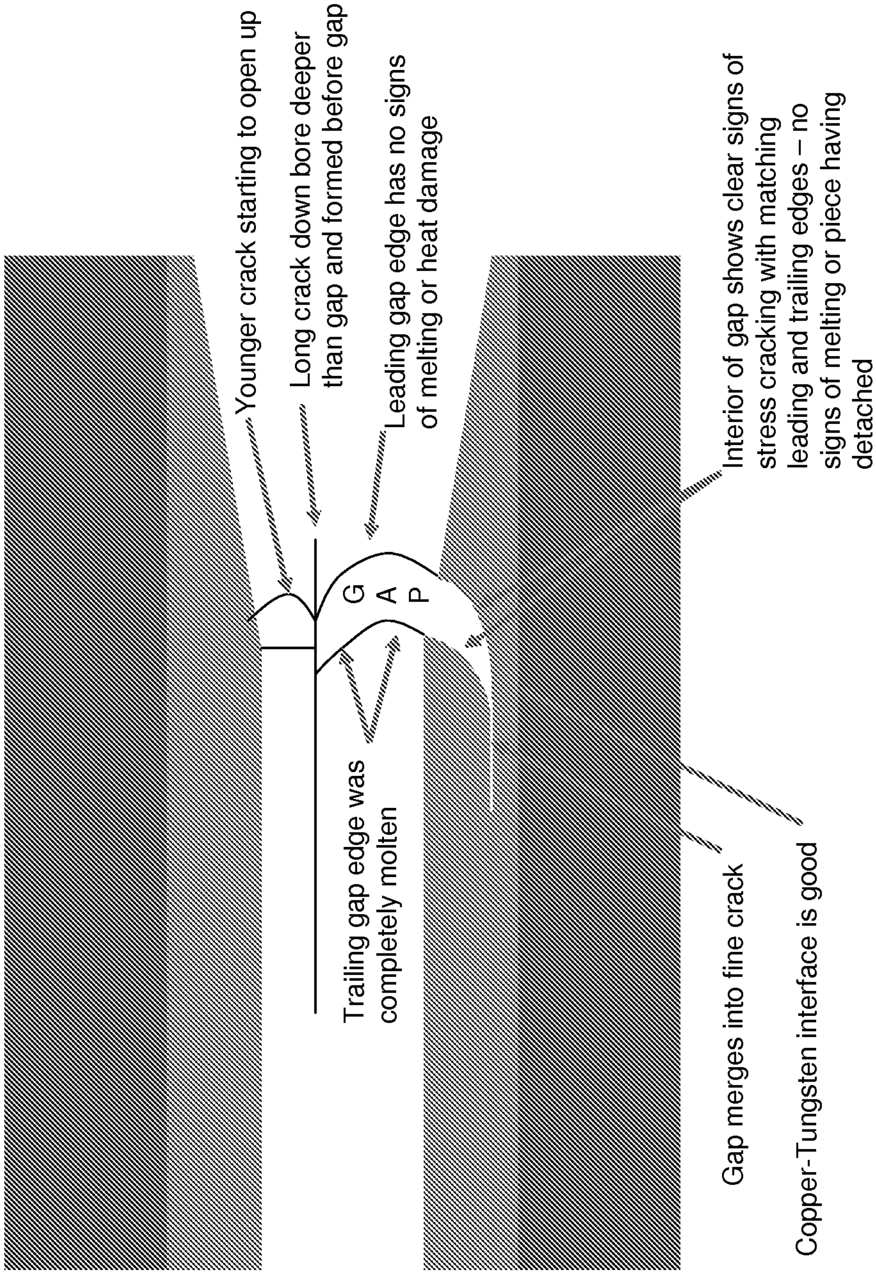
FIG. 11*c* shows a diagram that illustrates and describes aspects of the catastrophic stress failure shown in FIG. 11*b*.

FIGS. 11*a*-11*c* show a comparison between a computer model generated stress failure of the Tungsten lining (FIG. 11*a*) and an actual observed stress failure in the Tungsten lining (FIG. 11*b*). As should be apparent, the model shown in FIG. 11*a* was able to produce a stress failure in the Tungsten lining of a conventional nozzle in a manner comparable to that actually observed in FIG. 11*b*. As can be clearly discerned from a review of FIGS. 11*b* and 11*c*, the failure of the Tungsten lining results from crack formation that occurs in the Tungsten lining Importantly, the cracks occur in the same general location and have the same general orientation in both the model and the actual nozzle. In the observed nozzle (FIG. 11*b*), the area of and type of cracking corresponds closely with that of the highest stress concentration (darker region) shown in the computer model of FIG. 11*a*. Extensive testing has shown repeatedly that this cracking pattern will occur in this location and have this orientation. This has led the inventors to conclude that reducing or eliminating the stress concentrations in the darker stress concentration region shown in FIG. 11*a* can reduce or eliminate crack formation in this area and thus prevent failure of the Tungsten lining.

Figure 8:
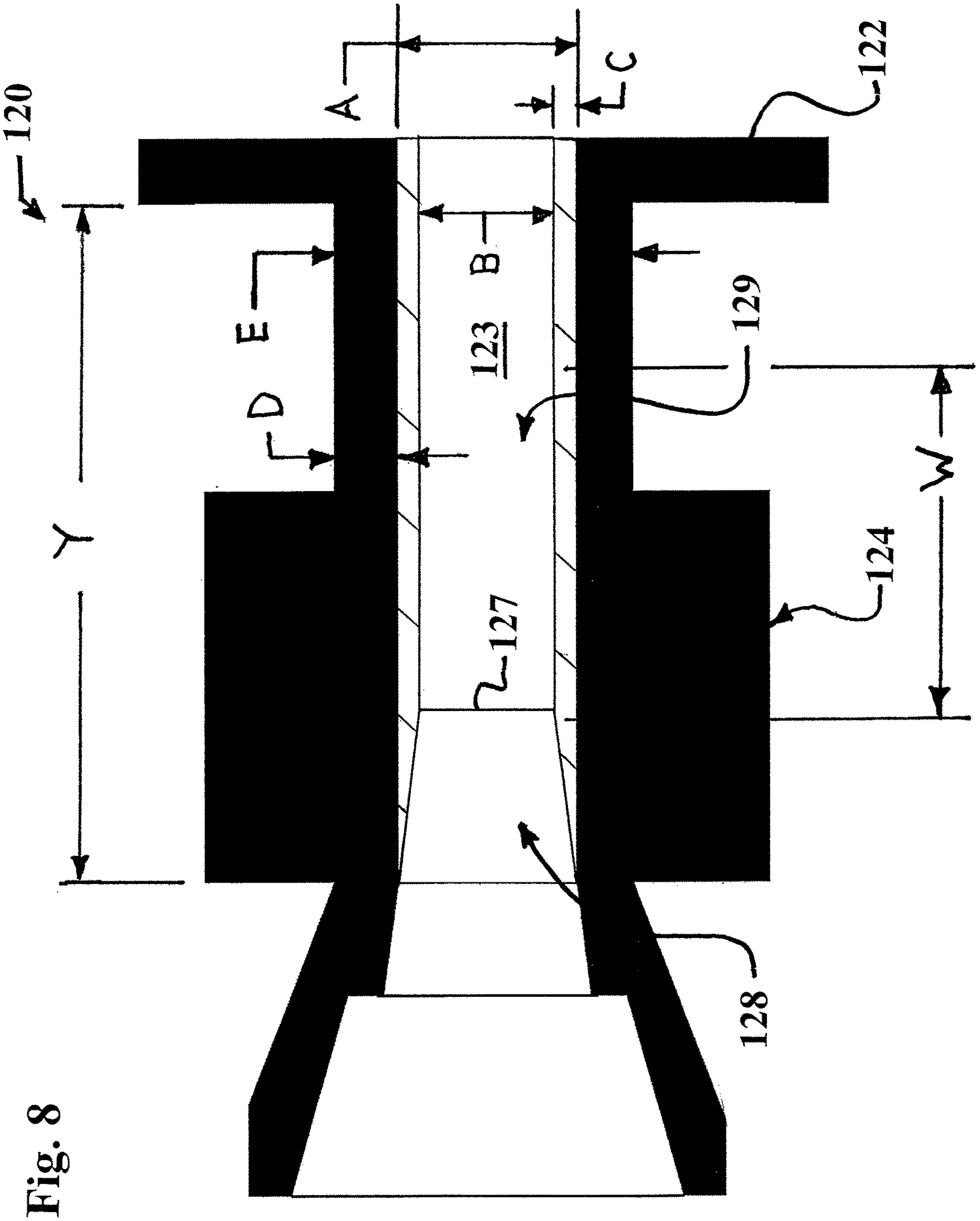
FIG. 8 shows a first non-limiting embodiment of a nozzle in accordance with the invention.

With reference to FIG. 8, it can be seen how a nozzle body of the type shown in FIGS. 2 and 3 can be designed to include a liner in accordance with the invention with the aim of achieving the stress profile shown in FIG. 7. In this embodiment, the nozzle 120 is manufactured with a liner material sleeve 123 in such a way as to eliminate or significantly reduce the localized thermal stresses associated with conventional nozzles, and especially so in an area of the arc attachment zone. This can be accomplished in a number of ways as will be described herein. In the embodiment of FIG. 8, this is accomplished by manufacturing the nozzle 120 so that the liner sleeve 123 has an outer cylindrical diameter "A", an inside cylindrical diameter "B" (which also defines the central bore of the nozzle 120), and a wall thickness "C". Furthermore, the wall thickness "C" is sized in relation to one or more characteristics of the main body portion of the nozzle 120. These characteristics include, among other things, the wall thickness "D" and/or the overall diameter "E" of the body of the nozzle 120. The diameter "E" can typically extend across axial width "Y" in FIG. 8. Additional characteristics include tailoring the thermal conductivity (which is a function of the wall thickness "C") of the liner 123 to that of the portion of the body surrounding the liner, i.e., to the wall thickness "D". This is especially the case in an area of the fins 124 and a portion of the body arranged immediately downstream of the fins 124 and which has a surface that can be placed in contact with the cooling fluid, i.e., the wall thickness "D" within axial width of the arc attachment zone. The axial length "Y" of the portion of the body of the nozzle 120 to which one tailors the wall thickness "C" of the liner 123 can extend from an upstream end of the fins 124 up to as far as the flange located at the downstream end 122 as shown in FIG. 8. However, value "C" is measured from point 127 to end 122 in FIG. 8, and is of most concern within an area defined by the axial width of the arc attachment zone.

In the non-limiting embodiment of FIG. 8, the wall thickness "D" should be of greater thickness than the wall thickness "C". A ratio of the wall thickness "D" to that of wall thickness "C" starting from an axial location corresponding the transition 127 and extending toward end 122 by an amount that is a fraction of the length "Y" should be a focus of concern. However, as noted above, the main focus should be the values arranged within an axial length shorter than "Y" such as that containing the arc attachment zone (see ref. 70 in FIG. 4). One should, for example, at least specifically take into account the values "C", "D" and "E" within the axial length "W" defined by the arc attachment zone (see also FIG. 4). By way of non-limiting examples, with the body of the nozzle 120 being made of a copper material and the liner 123 being made of a Tungsten material, these values can those specified in the table below.

According to one non-limiting example, a plasma gun nozzle of the type shown in FIG. 1 can be configured to utilize a nozzle 120 comparable to that of FIG. 8 and that utilizes a Tungsten lining or liner 123 whose wall thickness "C" is approximately 1.04 mm and which utilizes a ratio of total thickness (C+D) to Tungsten lining wall thickness C of about 5.2. Using such values, the nozzle 120 can be made operated with the stress profile closer to that of FIG. 7 while avoiding the stress concentrations shown in FIG. 6. Like that of FIG. 4, the liner 123 can include an upstream tapered portion 128 that generally matches the tapered upstream portion of the nozzle body and extends to transition 127 as shown in FIG. 8. The liner 123 can also include the main bore portion 129 that extends from the transition 127 to the end 122 of the nozzle 120.

Figure 10:
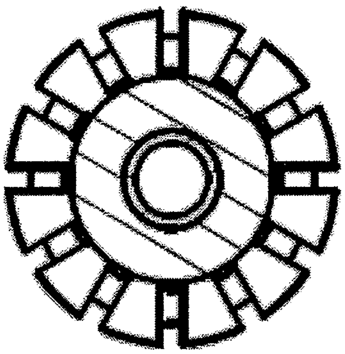
FIG. 10 shows a cross-section view of Section B-B in FIG. 9.
Figure 9:
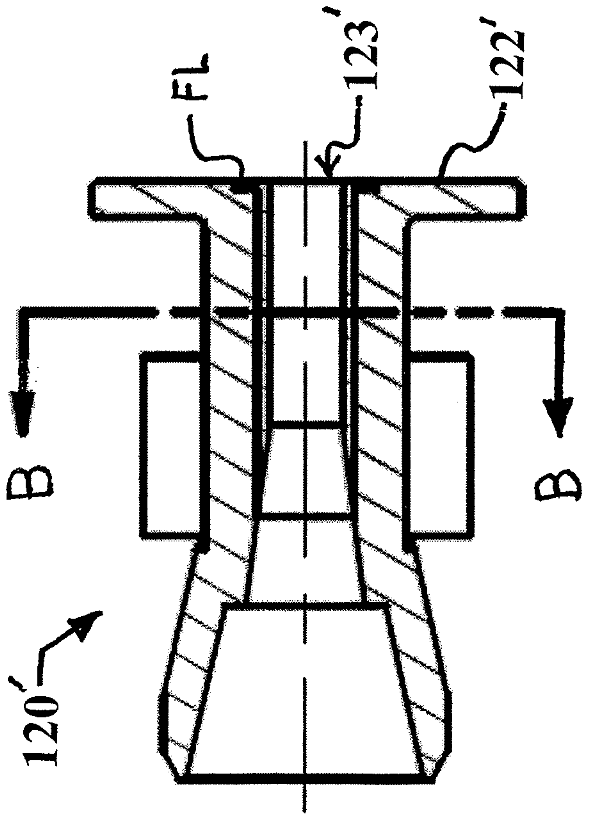
FIG. 9 shows a second non-limiting embodiment of a nozzle in accordance with the invention.

With reference to FIGS. 9 and 10, it can be seen how the invention can be implemented on a commercially usable nozzle 120'. In this embodiment, the liner 123' is sized and configured to the body of the nozzle 120' as disclosed herein and further includes a flange FL which can be seated in a comparably sized counterbore formed in end 122'. In this example, the nozzle 120' is similarly configured and sized to utilize a liner material sleeve 123' in such a way as to eliminate or significantly reduce the localized thermal stresses associated with conventional nozzles, and especially so in the arc attachment zone. The resulting thermal stress profile should be closer to that shown in FIG. 7 as opposed to that of FIG. 6.

In accordance with another non-limiting example of the invention, there is provided a plasma gun nozzle of any of the types shown in FIG. 1, 4, 8 or 9 having a thin Tungsten lining wall conforming to the following requirements. The wall thickness "C" should not be made so thin that the Tungsten liner will cease protecting the copper to the point where melting of the underlying copper occurs. On the other hand, the wall thickness "C" cannot be made too thick as it will allow stress concentrations to quickly build and result in potential catastrophic failure of the Tungsten liner. With this in mind, one can use an existing copper nozzle body in combination with a Tungsten liner having a generally cylindrical wall thickness "C" of between about 0.25 mm and about 1.25 mm, and preferably between about 0.5 mm and about 1.0 mm, and most preferably between about 0.75 mm and about 1.0 mm.

In accordance with still another non-limiting example of the invention, there is provided a plasma gun nozzle having a thin Tungsten lining wall conforming to the following requirements. The ratio between the total wall thickness of copper and Tungsten, i.e., C+D in FIG. 8, (shortest distance from the bore to cooling water passage or channel) and the thickness C of the Tungsten liner is taken into consideration. If this ratio is too large, the temperature experienced by the Tungsten liner increases which increases thermal stress between the Tungsten liner and the copper nozzle body. This can even result in melting of the Tungsten liner itself. On the other hand, if the ratio is too low, then too much heat can be transferred to the water channel causing internal boiling of the cooling fluid and excessive thermal losses. This can also result in the melting of the copper material in contact with the Tungsten liner. With this in mind, one can manufacture a nozzle wherein the ratio of C+D to C is between about 3.5:1 to about 7:1, and preferably between about 4:1 to about 6:1, and is most preferably about 5:1.

Other non-limiting exemplary values and ratios are shown in the table listed below which present various values for two exemplary Sulzer Metco plasma gun types. In the upper part of the table, three old nozzles, i.e., a 6 mm nozzle, a 7 mm nozzle, and an 8 mm nozzle, for a Sulzer Metco F4 plasma gun are compared to new comparable size nozzles for the same F4 plasma gun. In the lower part of the table, six old nozzles, i.e., a G-W nozzle, a GH-W nozzle, a 930 W nozzle, a 931 W nozzle, 932 W nozzle, and a 933 W nozzle for a Sulzer Metco 9 MB plasma gun are compared to new comparable size nozzles for the same 9 MB plasma gun. Extensive testing has shown that nozzles made using the new values have significantly longer operating life and thermal stress profiles closer to that shown in FIG. 7 and thus avoid the thermal stress profile shown in FIG. 6 believed to be associated with the old values.

catastrophic failure associated with the new nozzles represents a very significant improvement over old hardware—at least as it relates to the 6 mm F4 nozzle. Testing of 8 mm F4 nozzles has showed similar results with no catastrophic failures noted and with an improvement in average hardware life of around 25%. Testing of G-W nozzle with a 9 MB plasma gun again showed comparable improvement. Other listed Tungsten lined nozzles have not yet undergone such testing, but it is believed (based on past experience) that they are also likely to experience significant comparable improvement.

Additional experiments with Tungsten linings having a ratio of total thickness of Copper to Tungsten smaller than 3.00 and a Tungsten wall thickness of 2.00 mm demonstrated the benefits of the instant invention to be less dramatic. About 10% of the nozzles tested experienced

| Nozzle | A Tungsten Diameter (mm) | E Total Diameter (mm) | B Bore Diameter (mm) | C/(C + D) Thickness Variance | (C + D)/C Thickness Ratio | C Wall Thickness (mm) |
|---|---|---|---|---|---|---|
| | | | F4 | | | |
| Existing 6 mm | 11.89 | 17.00 | 6.00 | 0.54 | 1.87 | 2.95 |
| Existing 7 mm | 11.89 | 17.00 | 7.00 | 0.49 | 2.04 | 2.45 |
| Existing 8 mm | 11.89 | 17.00 | 8.00 | 0.43 | 2.31 | 1.95 |
| Optimized 6 mm | 8.08 | 17.00 | 6.00 | 0.19 | 5.29 | 1.04 |
| Optimized 7 mm | 9.04 | 17.00 | 7.00 | 0.20 | 4.90 | 1.02 |
| Optimized 8 mm | 9.70 | 17.00 | 8.00 | 0.19 | 5.29 | 0.85 |
| | | | 9MB | | | |
| Existing G-W | 9.04 | 14.73 | 6.35 | 0.32 | 3.12 | 1.35 |
| Existing GH-W | 9.04 | 14.73 | 6.35 | 0.32 | 3.12 | 1.35 |
| Existing 930W | 9.04 | 12.45 | 6.35 | 0.44 | 2.27 | 1.35 |
| Existing 931W | 9.04 | 12.45 | 5.54 | 0.51 | 1.97 | 1.75 |
| Existing 932W | 9.04 | 12.45 | 6.35 | 0.44 | 2.27 | 1.35 |
| Existing 933W | 9.04 | 12.45 | 5.54 | 0.51 | 1.97 | 1.75 |
| Optimized G-W | 8.08 | 14.73 | 6.35 | 0.21 | 4.84 | 0.87 |
| Optimized GH-W | 8.08 | 14.73 | 6.35 | 0.21 | 4.84 | 0.87 |
| Optimized 930W | 7.62 | 12.45 | 6.35 | 0.21 | 4.80 | 0.64 |
| Optimized 931W | 6.86 | 12.45 | 5.54 | 0.19 | 5.23 | 0.66 |
| Optimized 932W | 7.62 | 12.45 | 6.35 | 0.21 | 4.80 | 0.64 |
| Optimized 933W | 6.86 | 12.45 | 5.54 | 0.19 | 5.23 | 0.66 |

In the above Table, the value for C+D can be calculated from the equation (E−B)/2 and the value for D can be calculated from the equation (E−A)/2.

In cases where the preferred ratio between the total wall thickness of Copper and Tungsten (C+D/C) and the preferred wall thickness of Tungsten (C) cannot both be met simultaneously, then the total ratio should be given preference. In the above Table, both the preferred values for the ratio and wall thickness cannot be met at the same time for examples 930W through 933 W. As a result, preference for these examples is given to having the preferred ratio with the effect being that Tungsten lining is slightly thinner than is preferred.

Experiments have shown that one can improve the hardware life of an old 6 mm F4 nozzle operating at one extreme parameter condition by around 30% on average. Thus, the new 6 mm F4 nozzle can have improved hardware life over the old 6 mm F4 nozzle as follows: a hardware life from about an average of 17 hours (old 6 mm) to about an average of 23 hours (new 6 mm) More importantly, old hardware suffered a 30% catastrophic failure rate whereas no new listed nozzle has failed catastrophically as of the filing date of the instant application. Furthermore, the variation in hardware life as such went from about +/−4 hours to less than +/−1.5 hours. This improved consistency and lack of catastrophic failure of the Tungsten lining versus 30% for conventional nozzles and 0% for the most for the most preferred ratio and wall thickness. Likewise experiments with Tungsten linings with a ratio greater than 7 and a Tungsten wall thickness less than 0.5 mm resulted in a number of nozzles where the Copper beneath the Tungsten lining, in the region of arc attachment, having melted and the Copper bled through the hairline axial cracks. Although this does not result in catastrophic failure of the Tungsten lining, it does have undesirable effects such as Copper spitting and shorter hardware life due to accelerated voltage decay.

Although the various embodiments of the nozzle disclosed herein can be manufactured in a variety of ways, one can, by way of non-limiting example, make the same by first placing a solid Tungsten rod into a casting mold and casting a copper material sleeve around the Tungsten rod. Once removed from the casting mold, the cast assembly can be machined so as to form both the outside profile and the inside profile shown in, e.g., FIGS. 8-10. The inside profile specifically includes machining sections 128 and 129 of the liner shown in FIG. 8. During the machining, reference to the specifications shown in the above-noted table should be taken and/or to the criteria for disclosed herein for tailoring the various values A-E described herein. Most of the machining can take place via a CNC lathe with the fins 124 being formed on a CNC milling machine.

In each of the herein disclosed embodiments, the composition of the Tungsten liner can include any doped Tungsten material including but not limited to Thoriated, Lanthanated, Ceriated, etc. Other material considerations include high Tungsten alloys such as CMW 3970, Molybdenum, Silver, and Iridium. As used herein, an alloy is a solid solution of a metal and at least one other element, usually other metals to form a single crystalline phase. Examples Brass, Inconel, stainless steel. In the case of Tungsten alloy, the Tungsten contains small amounts of Nickel and Iron in a solid solution or alloy. Also as used herein, a doped substance is one in which a contaminant or impurity (doping agent) is added to a material, usually a metal or semiconductor. The result is a matrix of a material with an embedded second substance. Typical doping agents are ceramics such as aluminum oxide, thorium oxide, and lanthanum oxide; and elements such as boron, phosphor, and sulfur. In the case of the Thoriated or Lanthanated Tungsten, the Tungsten contains small crystalline impurities of Thorium oxide or Lanthanum oxide. When using materials other than Tungsten, one should adjust the thicknesses and ratios accordingly to take account of the possibilities of melting, stresses, and conductivity properties. Both Moly and CMW 3970 have been tried with some success. Silver and Iridium can be considered but are currently too expensive.

Since Tungsten lining materials have in the past been known to crack or fracture (and thus reduce hardware life), other materials may offer some improvement in this regard. Such materials should preferably have the following properties. They should be more ductile and fracture tolerant than Tungsten especially under high thermal loading and high temperature gradients. They should also have a high melting point similar or close to that of Tungsten. And when lower, they should have a high enough thermal conductivity to compensate for having a lower melting point than Tungsten. Potential materials include pure metals such as Silver, Iridium and Molybdenum as they have many of the above-noted desired properties. Although, as noted above, Silver and Iridium are arguably currently too expensive for practical use, Molybdenum is affordable. Other options include Tungsten alloyed with small amounts of iron or nickel as they have acceptable properties. Preferably, such materials include at least 90% of the primary metal, i.e., Tungsten in the case of a Tungsten alloy. To select the material, one can graph the differential temperature versus thermal conductivity and determine which it is likely to withstand direct contact with the plasma arc. This differential temperature is preferably the difference between the melting point and average plasma temperature (about 9000K) and at least an inverse of the melting temperature. When this is performed for the materials discussed above, i.e., Molybdenum, Iridium, Tungsten, Copper and Silver come closest to having many of the desired properties even while possessing significant differences in regards to ductility, being susceptible to thermal shock and cracking. Preferred materials include Tungsten and Molybdenum and their alloys such as Tungsten containing about 2.1% Nickel and about 0.9% hon. Other Tungsten alloys include those with higher amounts of Nickel and Copper, but with lower melting points and thermal conductivity, but higher ductility as well as those with lower amounts of Nickel and Copper, but with higher melting points and thermal conductivity, but lower ductility. Other materials that can be alloyed with Tungsten include Osmium, Rhodium, Cobalt and Chromium. These metals possess a high-enough melting point and high thermal conductivity such that they can be alloyed with Tungsten and utilized in a nozzle liner material. Commercial grade Molybdenum and a Tungsten alloy having 2.1% Nickel and 0.9% Iron have both been tested and used in nozzle liners by Applicant, and have been compared to a Copper only nozzle.

In addition to the exemplary embodiments discussed above, the invention also encompasses a nozzle utilizing a Lanthanated Tungsten liner having a wall thickness C of between about 0.75 mm and about 1.26 mm, and optionally between about 0.84 and about 1.10 mm or between about 0.75 mm and about 1.10 mm, in combination with a ratio, i.e., (C+D)/C, of between about 4.75 or 4.75:1 and about 5.75 or 5.75:1.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and sprit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A thermal spray gun having improved nozzle life and operating performance comprising:

a cathode arranged inside a body of the thermal spray gun and having an arc emitting end;

a nozzle body that extends into and is removable from the body of the thermal spray gun;

a liner material arranged within the nozzle body and having an inside surface with an arc attachment zone, said inside surface defining an internal bore having a diameter, measured at an area of the arc attachment zone, larger than a diameter of the arc emitting end;

a material of the nozzle body having a lower melting temperature than that of the liner material;

an internal coolant receiving space surrounding a portion of the nozzle body and communicating with cooling channels in the body of the thermal spray gun;

a total wall thickness of the portion of the nozzle body and the liner material measured at an imaginary plane passing through the coolant receiving space and the arc attachment zone to that of a wall thickness of the liner material measured at the imaginary plane defining a ratio, wherein the liner material is made of a Lanthanated Tungsten and the ratio being between about 4.75:1 and about 5.75:1, wherein the thermal spray gun is structured and arranged to apply a coating, and wherein the ratio results in a reduction of thermal stresses and a reduced potential for cracking in the arc attachment zone.

2. The thermal spray gun of claim 1, wherein the nozzle body is made of a copper material.

3. The thermal spray gun of claim 1, wherein, in normal operation, the liner material experiences less or comparable thermal stress in an area of the arc attachment zone than in an area downstream of the arc attachment zone.

4. The thermal spray gun of claim 1, wherein the wall thickness of the liner material is at least one of:

between about 0.25 mm and about 1.25 mm;
between about 0.50 mm and about 1.0 mm; and
between about 0.75 mm and about 1.0 mm.

5. The thermal spray gun of claim 1, further comprising a cathode and an anode body through which cooling fluid circulates.

6. A plasma coating nozzle having improved nozzle life and operating performance for a thermal spray gun comprising:

a coating nozzle body that is configured to extend into and be removable from a body of the thermal spray gun;

a liner material arranged within the nozzle body and comprising an inside surface having an arc attachment zone;

said inside surface defining an internal bore having a diameter that, when the coating nozzle body is installed so as to extend inside the thermal spray gun, is configured to be larger, in an area of the arc attachment zone, than a diameter of an arc emitting end of a cathode of the thermal spray gun;

an internal liquid coolant receiving space surrounding a portion of the nozzle body and a portion of the arc attachment zone, said coolant receiving space being configured to communicate with cooling channels located inside the body of the thermal spray gun;

a material of the nozzle body having a lower melting temperature than that of the liner material; and a total wall thickness, measured in a cross-sectional area of the arc attachment zone, of the portion of the nozzle body and a portion of the liner material to that of a wall thickness of the liner material defining a ratio, wherein the liner material is made of a Lanthanated Tungsten and the ratio being between about 4.75:1 and about 5.75:1; and wherein the ratio results in a reduction of thermal stresses and a reduced potential for cracking in the arc attachment zone.

7. The nozzle of claim 6, wherein the plasma coating nozzle is a replaceable nozzle.

8. The nozzle of claim 6, wherein the nozzle body is made of a copper material.

9. The nozzle of claim 6, wherein the wall thickness of the liner material is at least one of:

between about 0.25 mm and about 1.25 mm;
between about 0.50 mm and about 1.0 mm; and
between about 0.75 mm and about 1.0 mm.

10. The nozzle of claim 6, wherein a first portion of the liner material has an internal tapered section and a main portion of the liner material is generally cylindrical.

11. A method of making the nozzle of claim 6, comprising:

forming the liner material with a wall thickness whose value takes into account at least one of:

a wall thickness of a portion of the nozzle body; and a ratio of a total wall thickness of a portion of the nozzle to that of a wall thickness of a portion of the liner material.

12. A method of coating a substrate using a thermal spray gun, comprising:

installing the nozzle of claim 6 on a thermal spray gun; and plasma spraying a coating material onto a substrate utilizing the thermal spray gun.

* * * * *